US006467969B1

(12) United States Patent
Shmulovich

(10) Patent No.: US 6,467,969 B1
(45) Date of Patent: Oct. 22, 2002

(54) ARTICLE COMPRISING A MULTIMODE OPTICAL FIBER COUPLER

(75) Inventor: Joseph Shmulovich, Murray Hill, NJ (US)

(73) Assignee: Agere Systems Guardian Corp., Orlando, FL (US)

( * ) Notice: Subject to any disclaimer, the term of this patent is extended or adjusted under 35 U.S.C. 154(b) by 26 days.

(21) Appl. No.: 09/663,014

(22) Filed: Sep. 15, 2000

(51) Int. Cl.[7] .................................................. G02B 6/40
(52) U.S. Cl. ............................................ 385/54; 385/49
(58) Field of Search .............................. 385/54, 49, 43, 385/39, 59, 115, 116

(56) References Cited

U.S. PATENT DOCUMENTS 3,933,455 A * 1/1976 Chown ....................... 385/115
4,763,975 A * 8/1988 Scifres et al. ............... 385/115
5,887,097 A * 3/1999 Henry et al. .................... 372/6
6,201,909 B1 * 3/2001 Kewitsch et al. ........... 359/124
6,219,480 B1 * 4/2001 Cassarly et al. .............. 385/31
6,301,412 B1 * 10/2001 Mori et al. ................... 385/43
6,324,326 B1 * 11/2001 Dejneka et al. .......... 359/341.1

* cited by examiner

*Primary Examiner*—Tulsidas Patel
*Assistant Examiner*—Brian S. Webb
(74) *Attorney, Agent, or Firm*—Lowenstein Sandler PC

(57) ABSTRACT

The present invention is an optical coupler comprising a plurality of optical fibers that have unclad (core-exposed) ends and tapered cladding regions extending to cladded ends. The core-exposed ends are arranged in a bundle, and the cladded ends can be arranged as needed. The optical coupler can efficiently couple between waveguides of different core areas and shapes. For example, it may be used to connect a multimode collection fiber having a core area of greater than 50 μm to a planar waveguide amplifier having waveguide strips with heights of 5 μm or less.

11 Claims, 3 Drawing Sheets

30
31a
31b
31c
31d
31e
40
12a
13b
12b
13a
18
13e
12e
11a
11e
10
19
11b
11d
11c
15
L
20
22

74
72
75
71
77c
77d
61d
77b
80
77a
61c
61a
61b
60
57d
57c
57a
55
57b
51
54
50
52

ARTICLE COMPRISING A MULTIMODE OPTICAL FIBER COUPLER

FIELD OF THE INVENTION

The present invention relates to waveguide couplers and more particularly, to waveguide couplers that are efficient for coupling of light between waveguides having different shapes or dimensions. The invention is particularly useful in communications systems and in free-space optical detectors.

BACKGROUND OF THE INVENTION

Optical communication systems can transmit optical signals over long distances at high speeds. An optical signal is transmitted from a light source to a waveguide and ultimately to a detector. Optical waveguide structures such as optical fibers transmit the light signals. Basically, a waveguide structure comprises an inner region (the core) fabricated from a material having a certain index of refraction, and an outer region (the cladding) contiguous to the core comprised of a material having a lower index of refraction. A light beam propagated along the core will be guided along the length of the waveguide by total internal reflection.

Planar waveguides are flat structures that guide light in the same way as optical fibers. Essentially, a planar waveguide comprises a core waveguide strip of material on a substrate where the waveguide strip has a relatively high index of refraction relative to the substrate. Thus, light is guided along the high index strip.

Optical communications systems typically include a variety of devices (e.g., light sources, photodetectors, switches, optical fibers, amplifiers, and filters). Amplifiers and filters may be used to facilitate the propagation of light pulses along the length of the waveguide.

The connections between the various system components inherently produce loss in optical communication systems. Typically, optical fibers and devices are coupled together by splicing and bonding fiber ends or by using connectors. There is a loss in transmitted light that travels from one device to the other. With the increasing demand for efficient, large-scale manufacturing of hybrid integrated opto-electronic devices, there is a need to couple many waveguide devices together while minimizing losses. For example, planar waveguide amplifiers are desirable front ends for certain detectors, and for such applications it would be desirable to couple planar waveguides with a multimode signal collection fiber.

Many other factors contribute to losses in making waveguide connections. Such factors include overlap of fiber cores, misalignment of the fiber axes, fiber spacing, reflection at fiber ends, and numerical aperture ("NA") mismatch. If a fiber receiving light has a smaller NA than a fiber delivering the light, some light will enter the receiving fiber in modes that are not confined to the core and will leak out of the receiving fiber. The loss can be quantified by the formula: Loss (dB)=10 $\log_{10} (NA_2/NA_1)^2$.

Significant losses can occur if the signals are traveling from a large core into a smaller core. For example, loss of 1.9 dB can occur when light travels from a 62.5 μm core fiber to a 50 μm core mulitmode fiber. In some applications it would be desirable to couple light from a fiber core (having a typical dimension of 50 μm to 62.5 μm) to a planar waveguide or a sputtered film. However, planar waveguide amplifiers typically cannot be made with cores that are more than about 5 μm thick, and conventional sputtered films have a thickness of about 2–3 μm. On the other hand, a multimode signal collection fiber used in free-space optical reception systems has a core that is typically more than 50 μm in diameter. This mismatch in vertical dimension makes it very difficult to efficiently couple light from a multlimode signal collection fiber to a planar waveguide. Losses can amount to up to 17 dB or in some cases up to 97 or 98 percent of the light.

As may be appreciated, those involved the development of communication systems and electro-optical devices continue to seek new designs to improve efficiency and performance. In particular, it would be advantageous to have a mechanism for addressing the vertical dimension mismatch in the cores of the components being coupled, particularly as between an optical fiber and planar waveguide.

SUMMARY OF THE INVENTION

The present invention is an optical coupler comprising a plurality of optical fibers that have unclad (core-exposed) ends and tapered cladding regions extending to cladded ends. The core-exposed ends are arranged in a bundle, and the cladded ends can be arranged as needed. The optical coupler can efficiently couple between waveguides of different core areas and shapes. For example, it may be used to connect a multimode collection fiber having a core area of greater than 50 μm to a planar waveguide amplifier having waveguide strips with heights of 5 μm or less.

BRIEF DESCRIPTION OF THE DRAWINGS

The advantages, nature and various additional features of the invention will appear more fully upon consideration of the illustrative embodiments now to be described in detail in connection with the accompanying drawing. In the drawings.

It is to be understood that these drawings are for the purposes of illustrating the concepts of the invention and are not to scale.

DETAILED DESCRIPTION OF THE INVENTION

This invention is a waveguide structure that efficiently couples light between waveguides having mismatched cores. The term "waveguide" as used herein refers generally to light transmission structures such as planar waveguides and optical fibers. The term "core" refers to the high refractive index light propagation region of the waveguides.

Figure 1:
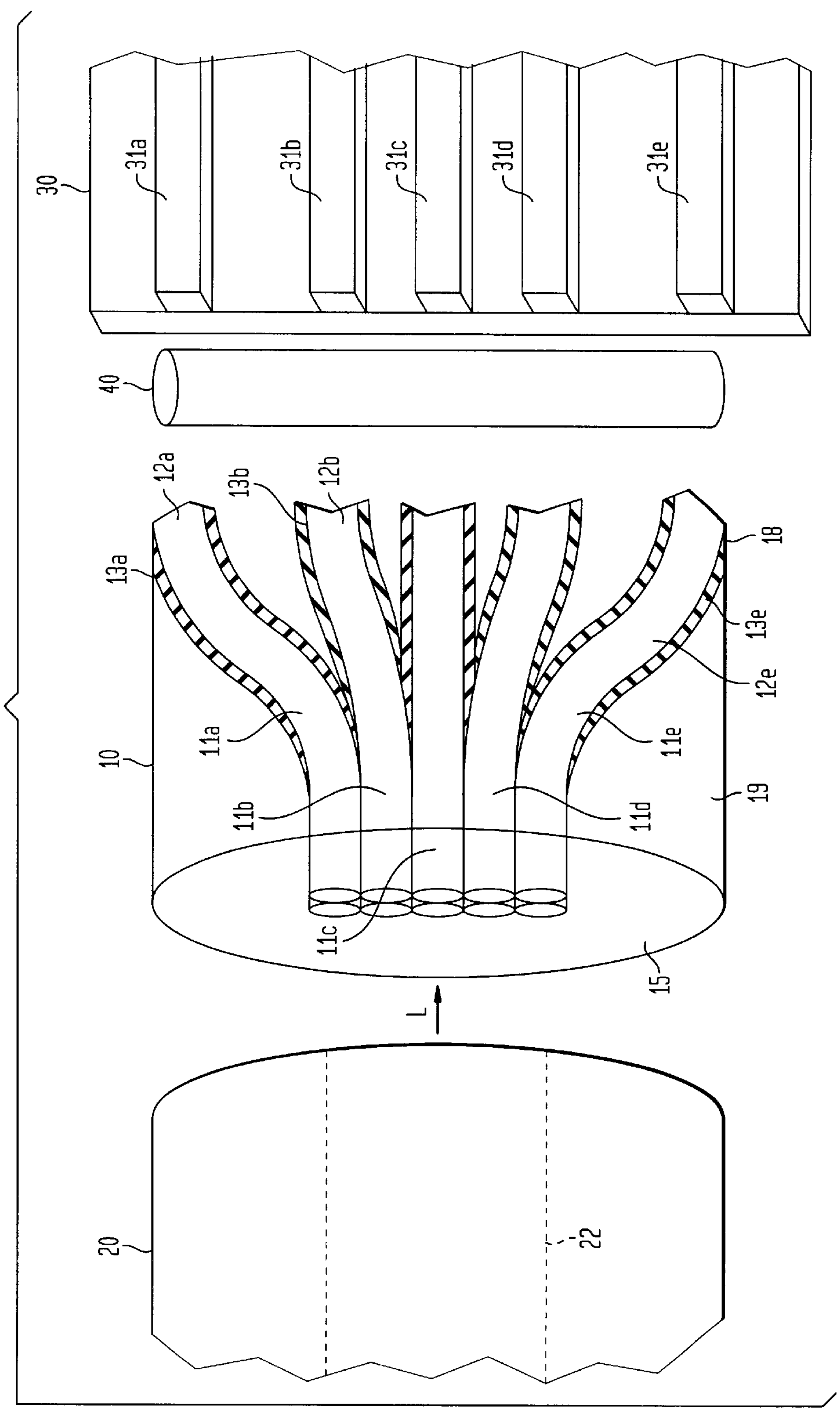
FIG. 1 is a schematic perspective (and partially cross-sectional) view of one embodiment of the inventive coupler disposed between an optical fiber and an array of planar waveguides.

Referring to the drawing, FIG. 1 is a schematic perspective (and partially cross-sectional) view of one embodiment of the inventive coupler 10 shown in position for coupling light between an optical fiber 20 and an array of planar waveguides 30. The coupler 10 provides a plurality of fibers 11*a*, 11*b*. . . , 11*e*, each fiber having a high refractive index core 12*a*, 12*b*, . . . , 12*e* and a lower refractive index cladding region 13*a*, 13*b*, . . . , 13*e*. The fiber claddings are tapered from essentially zero thickness at the first ends 15 of the fibers to a final thickness at or before the second or "cladded" ends 18 of the fibers. Preferably, the taper is "adiabatic," meaning that it is sufficiently gradual over the length of the fiber that the modes are maintained and scattering losses are negligible.

The tapered cladding fibers 11a, 11b, . . . , 11e can be made by processes well known to those skilled in the art. For example, the tapering of the cladding can be achieved with a subtractive process, such as by slowly pulling the clad fibers out from HF etchant (~1% HF). Other etchants may be used such as $K_4Fe(CN)_6$, $K_3Fe(CN)_6$, $Na_2S_2O_3$, KOH in $H_2O$. Alternatively, the tapered cladding can be formed by an additive process such as by sputtering, evaporation, chemical vapor deposition, electrodeposition, electroless deposition and dip-coating.

At the first ends 15 of the fibers (also referred to herein as the "core-exposed ends"), there is no appreciable surrounding cladding, and the core is exposed. The core-exposed ends 15 are bundled together and preferably adhered or fused together to form a single rod.

The fibers 11a, 11b, . . . 11e advantageously have an elongated latitudinal cross-section. As more clearly shown in FIG. 2 the fibers are preferably elongated to an oval cross section. Round fibers, elliptical fibers, hexagonally-shaped fibers, or other shaped fibers also may be used; however, the shape of the fibers may impact on the number of fibers that will be needed to make the connection.

Figure 2:
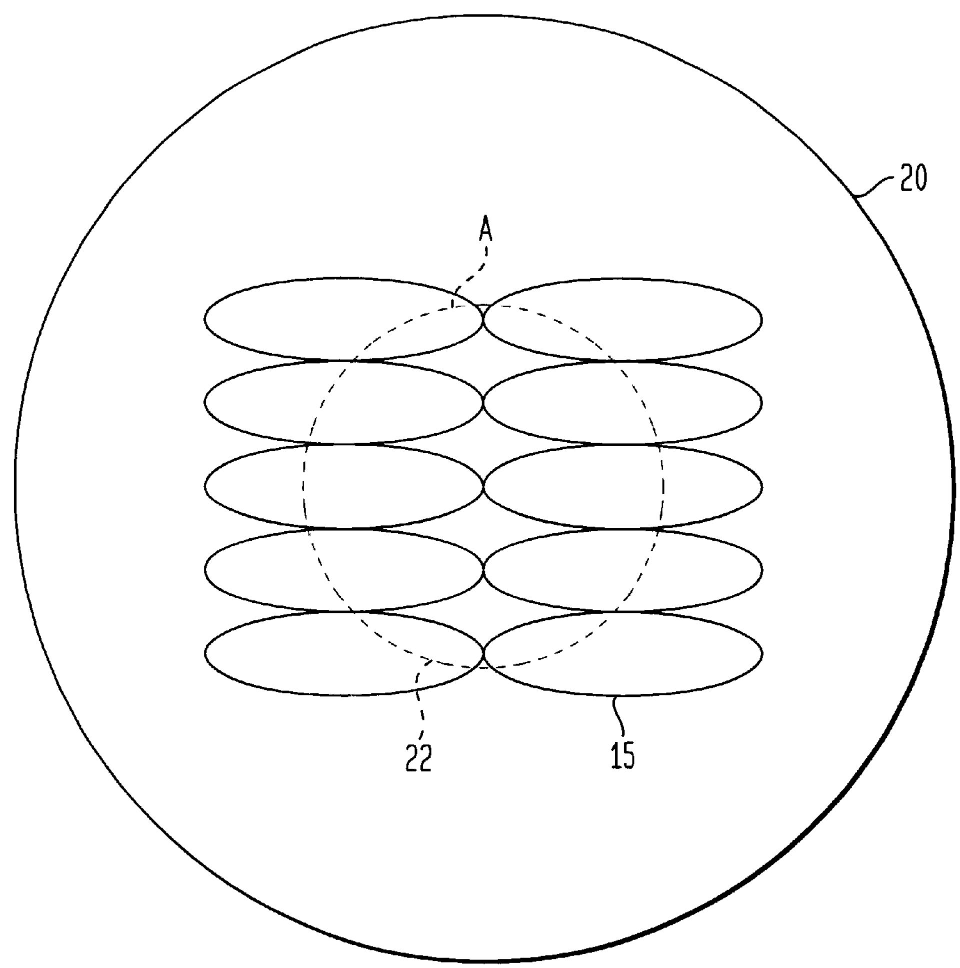
FIG. 2 is a view of the coupler of FIG. 1 looking in the direction of arrow "L" in FIG. 1.

The bundled ends 15 are arranged to optically couple with the core 22 of the transmitting fiber 20. Specifically, the surface area of the bundled, core ends 15 is larger than the core 22 of the transmitting input fiber to minimize losses. FIG. 2 shows a latitudinal cross-section of the bundled fibers looking in the direction of arrow "L" of FIG. 1. The core area of the input fiber is shown superimposed on this cross-section along dashed line "A" advantageously falling within the bundled core ends. This area "A" is referred to herein as the bundle input area. If each fiber in the bundle has a NA not smaller than that of the transmitting fiber, and the bundle input area covers the entire core area of the input fiber, then there should be minimal signal loss.

Referring back to FIG. 1, the plurality of fiber ends 15 are fused together. The fusing may continue along a section of the graded cladding portion of the fibers that is sufficient to support the NA of the fiber. The fibers slowly spread out to an array of splayed individual fibers at or near the cladded ends 18. The cladded ends 18 can be arranged as needed to couple into a second waveguide or device. The resultant array of fibers may be collectively coupled to the face of one or more waveguides or, as shown in FIG. 1, they may be individually coupled to an array 30 of waveguide strips 31a, 31b, . . . 31e.

The coupling of the fibers to the waveguide strips may be facilitated with one or more lenses 40. A cylindrical lens 40 as shown in FIG. 1 is preferred, as it provides focusing in the direction normal to the substrate. A plastic jacket 19 may surround the bundled ends 15 and maintain the cladded ends 18 in a configuration needed to couple to a downstream component or waveguide.

Figure 3:
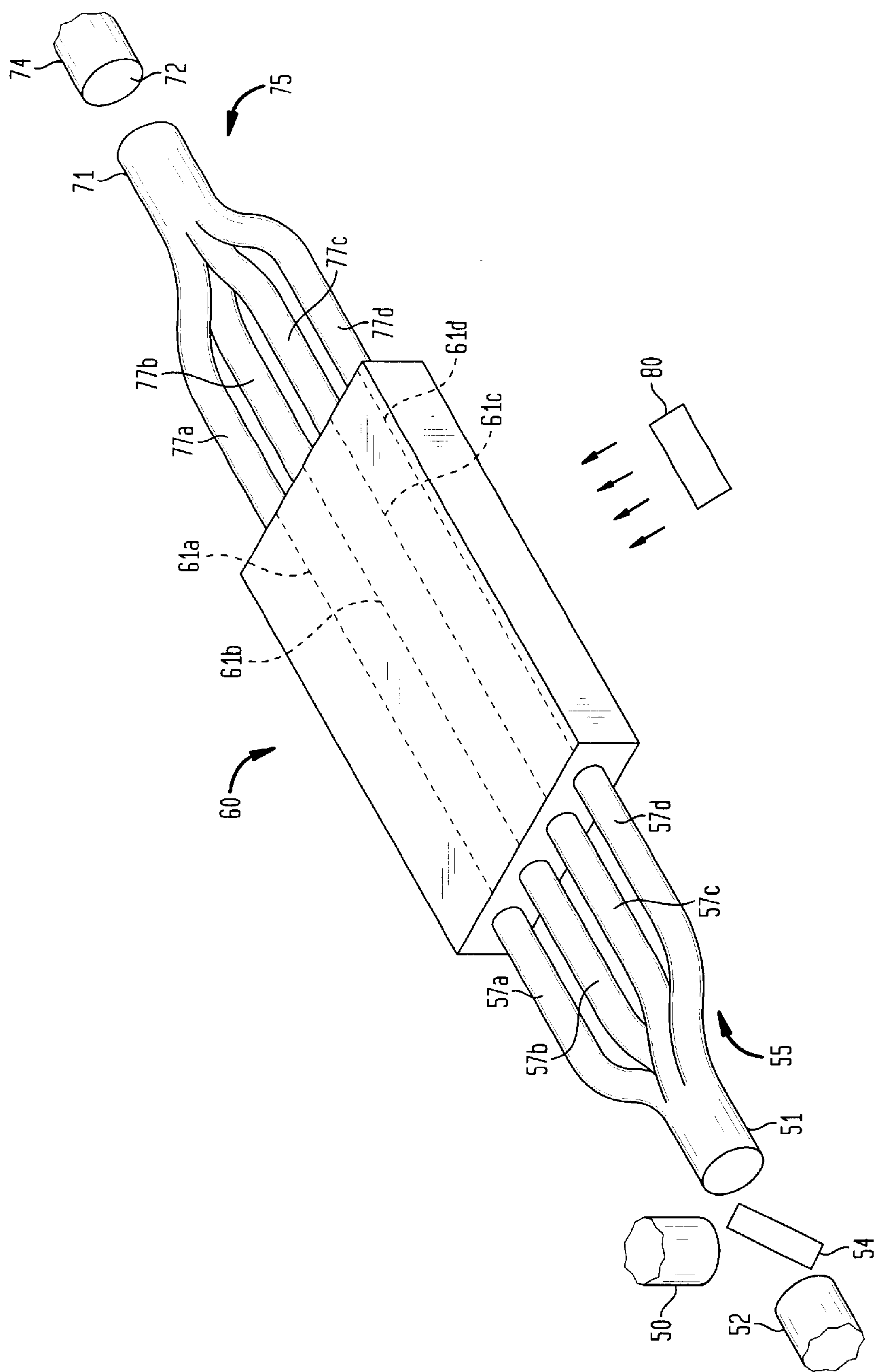
FIG. 3 is a schematic illustration of the use of couplers according to FIG. 1 as front and back end components of a planar waveguide amplifier.

FIG. 3 illustrates a preferred application of two FIG. 1 couplers 55, 75 in coupling light into and out of a planar waveguide optical amplifier 60. The amplifying arrangement comprises a pump input fiber 50 and signal input fiber 52 with the pump and signal light combined by free space combiner 54 and directed into the first fiber coupler 55, having a fiber bundle 51 at the input end. The plurality of fibers comprising the bundle 51 have claddings that are tapered outward, so that the fibers in the bundle are splayed into individual fibers 57a, 57b, . . . , 57d, and coupled to an array of amplifying waveguides 61a, 61b, . . . , 61d of planar waveguide amplifer 60. A second coupler 75 is connected at the output of the planar waveguide 60 with light from each of the waveguide films being directed into individual splayed fibers 77a, 77b, . . . , 77d, that are tapered down into a fiber bundle 71. Light from bundle 71 could be directed into output fiber 72 toward receiver (not shown), and/or a splitter 74 may be disposed in the output path. The receiver bundle 71 can be optimized independent of the input constraints. According to another aspect of the invention, the receiver bundle 71 is continued as a "fiber bundle transmission line" to a remote location and/or to the detector (not shown). This approach may be advantageous in that smaller cores will produce less dispersion than larger cores, as they support fewer modes.

The number of fibers used in the bundles, the dimensions of the fiber cores and planar waveguides, the degree of taper, the composition of the components, and other design considerations may be adjusted depending on the application. In matching the coupler with the planar waveguides and/or multimode fiber, one consideration is that the cross-sectional area of the core, times the square of the numerical aperture, optimally should be the same on both sides of a juncture. In other words, if "A" denotes the cross-sectional core area for signal input or output and NA is the numerical aperture then $A\times(NA)^2$ should be substantially constant throughout the system (within 5% and preferably 1% of the mean).

The invention is advantageous in many ways. By enabling coupling of waveguides having vertical dimension mismatches, a planar waveguide may be used as an amplifier and efficiently coupled with a multimode fiber. Planar waveguide amplifiers may be more highly doped than optical fiber amplifiers. Additionally, in multimode applications, dispersion is an important factor as an increase in modes results in greater dispersion. With this invention, there is no modal noise penalty in the amplifier, beyond the small modal dispersion in the individual waveguides. Additionally, with the invention an increase in the input image size does not increase the modal noise penalty. By providing low-dispersion optical amplification, the invention increases the flexibility of the system with regard to use of photodetectors. Low-dispersion optical amplification permits use of avalanche diodes as photodetectors.

According to another aspect of the invention, the amplification of individual waveguides 61a, 61b, . . . , 61d (FIG. 3) may be manipulated to compensate for or create patterns in the image. Also, the planar waveguides may be structured to reduce dispersion. It is beneficial to utilize a narrower core in the planar waveguides to reduce the number of modes and hence, cause less dispersion. The splayed ribbon of fibers (FIG. 1, 18), may be arranged to match up collectively to the face of a single waveguide, or they may be arranged to match the fibers to individual waveguides as shown in the figures herein. The waveguide amplifier structure 60 may be pumped in a cladding-pumping mode from the side by one or more extended cavity laser pumps schematically illustrated at boxed region 80 (FIG. 3). This edge-pumping scheme can increase pumping efficiency. The cladding of the planar waveguide can be shaped and dimensioned to confine the edge-pumped radiation, e.g., it can be formed as a ring-shaped or serpentine cladding arrangement.

In supporting the total number of modes in the multimode fiber, a waveguide amplifier advantageously is provided having cross-sectional dimensions of tens of microns. Such a structure can be fabricated by applying dry etching or deposition techniques known in the field. Alternatively, the waveguide structure can be fabricated from bulk glass applying the process described in applicant's co-pending United States patent application Ser. No. 09/663,013 filed contemporaneously herewith and entitled "Method For Making A Planar Waveguide." The application is incorporated herein by reference.

The invention can be better understood from the following Examples.

EXAMPLE 1

A multimode input fiber having a core of ~50 μm is coupled to an array of waveguides each having a height (film thickness) of 3 μm at the input end. The array of waveguides comprise aluminosilicate having a NA of 0.67. Optical fibers used for the coupling device have a NA of 0.23, and thus, the desired ratio of fiber diameter to waveguide height is 0.67/0.23~3. The diameter of the optical fibers is thus 9 μm (waveguide height of 3 μm×3), and nine fibers are needed to cover the 50 μm input core area of the multimode input fiber. (A greater number of fibers, i.e., 30, could be needed if the fibers are round.) Advantageously, at the input end the planar waveguides have a width of 30 μm and taper down to a dimension of 10 μm×3 μm to take advantage of the lateral dimension of the higher NA of the planar waveguide, as compared to the fiber.

EXAMPLE 2

A solid taper at the output end of the multimode collection fiber dimension reduces the NA requirements of the optical fibers in the coupler as compared with the configuration in Example 1. The output end of the multimode collection fiber is tapered from 50 μm to 100 μm which drops the NA requirement of the fibers in the bundle from 0.23 to $0.23(2)^{1/2}=0.16$. Thirty-two fibers of the same elongated cross-section of Example are needed, but signals may be transmitted to a waveguide planar waveguide having a smaller height (film thickness) of 2.1 μm (9×0.16/0.67=2.1). The lateral dimension of the planar waveguide is tapered down to 6.5 μm, resulting in planar waveguide dimensions of 2.1×6.5 μm, to support less modes as compared with Example 1.

It is understood that the embodiments described herein are merely exemplary and that a person skilled in the art may make variations and modifications without departing from the spirit and scope of the invention. For example, although the invention is described above with reference to a multimode collection fiber coupled to an array of planar waveguides, the same concepts can be applied with other configurations. All such variations and modifications are intended to be included within the scope of the appended claims.

I claim:

1. An article for optically amplifying optical signal light from a first waveguide and directing the amplified light into an optical output comprising:

a planar waveguide optical amplifier comprising an array of waveguide strips, the waveguide amplified having an input and an output;

a first optical coupler for coupling light into the optical amplifier, the first coupler comprising a plurality of optical fibers, each fiber having a core with a core index of refraction and a cladding having an index of refraction lower than the core index of refraction, the cladding of each fiber being tapered from a first substantially unclad end to a second cladded end, the plurality of fibers bundled together at the unclad ends for receiving the optical signal light and splayed apart at the cladded ends for optically coupling to the array of waveguide strips at the amplifier input; and a second optical coupler for coupling light from the optical amplifier, the second coupler comprising a plurality of optical fibers, each fiber having a core with a core index of refraction and a cladding having an index of refraction lower than the core index of refraction, the cladding of each fiber being tapered from a first substantially unclad end to a second cladded end, the plurality of fibers splayed apart at the cladded ends for optically coupling to the array of waveguide strips at the amplifier output and bundled together at the unclad ends for directing the amplified light into an optical output.

2. The article of claim 1 wherein the first waveguide has a core dimension of greater than about 50 μm and each amplifier waveguide strip has a core dimension of less than about 5 μm.

3. The article of claim 1 wherein the first waveguide comprises a multimode fiber and the second waveguide or device comprises a planar waveguide.

4. The article of claim 1 wherein the planar waveguide amplifier is pumped in a cladding-pumping mode from a side thereof.

5. The article of claim 1, wherein the planar waveguide amplifier has a height of at least 10 μm and a width of at least 30 μm.

6. The article of claim 1, wherein the plurality of optical fibers of at least one of the first and second optical couplers have a latitudinal cross-section elongated to an oval shape.

7. The article of claim 1 wherein the bundle of at least one of the first and second optical couplers is adhered or fused together to form a rod.

8. The article of claim 1, wherein the array of fibers at the cladded end comprise a bundle to define a fiber bundle transmission line.

9. The article of claim 1, wherein for each end of at least one optical coupler the cross-sectional area of the core times the square of the numerical aperture is substantially constant.

10. The optical communications system of claim 1, further comprising a lens for coupling the array of fibers to the waveguide amplifier.

11. An optical communications system including the article of claim 1.

* * * * *